Sept. 19, 1950             J. M. ZEPRUN             2,523,178

BAIGLE CUTTING MACHINE

Filed Nov. 4, 1948                            2 Sheets-Sheet 1

Inventor
Jack M. Zeprun
by Roberts, Cushman & Grover
Att'ys.

Sept. 19, 1950  J. M. ZEPRUN  2,523,178
BAIGLE CUTTING MACHINE
Filed Nov. 4, 1948  2 Sheets-Sheet 2
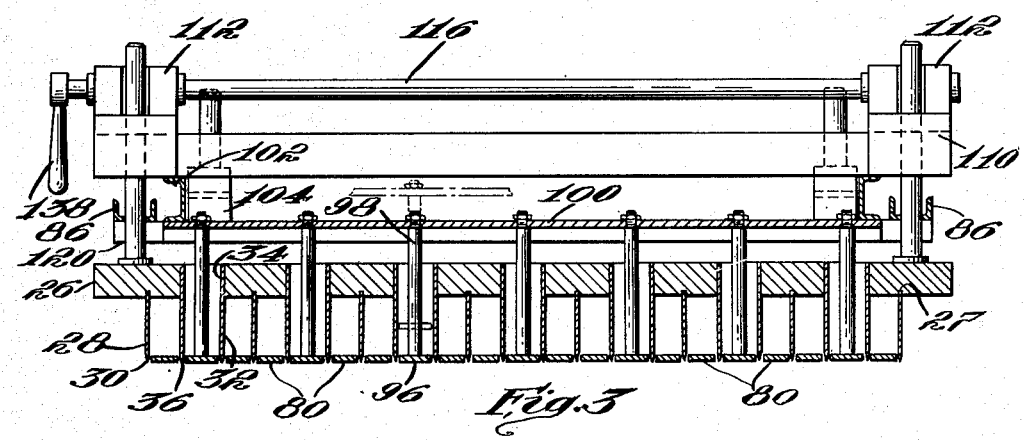
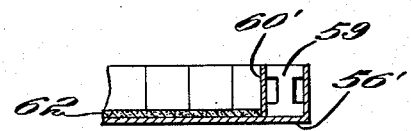
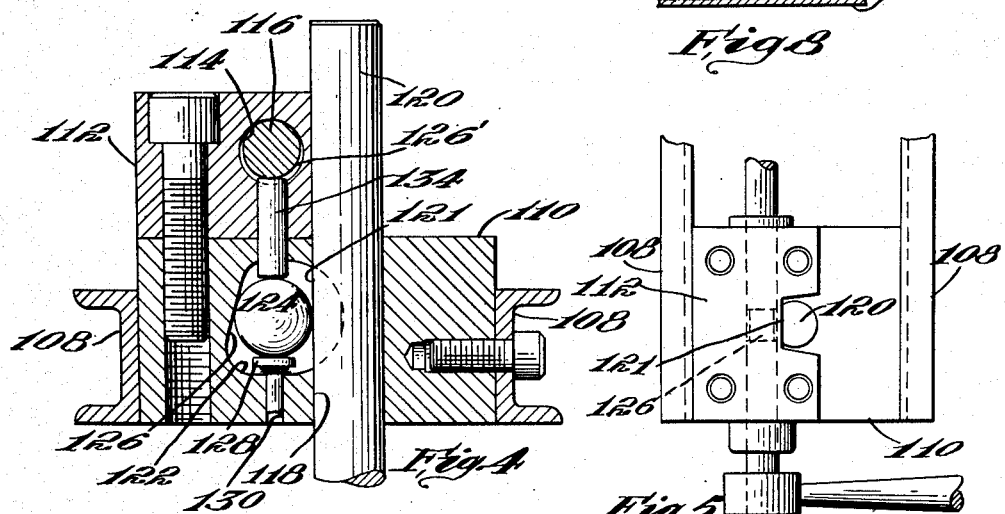
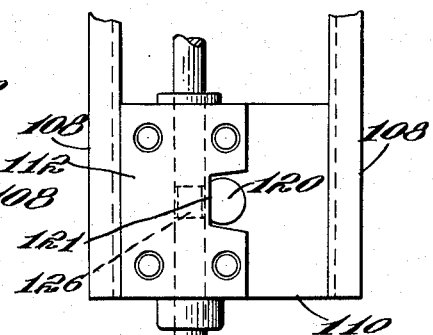
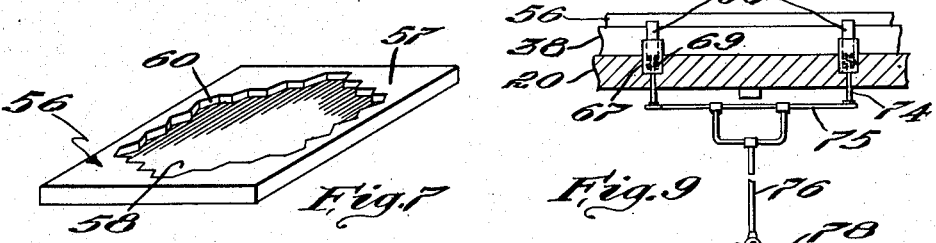
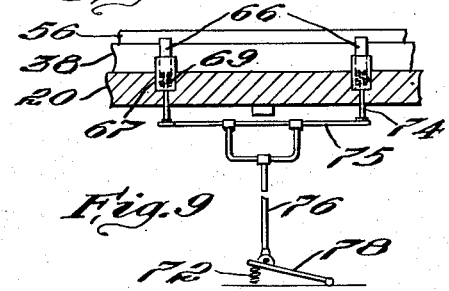
Inventor
Jack M. Zeprun
by Roberts, Cushman & Grover
Att'ys.

Patented Sept. 19, 1950

2,523,178

UNITED STATES PATENT OFFICE 2,523,178

BAIGLE CUTTING MACHINE

Jack M. Zeprun, Roxbury, Mass.

Application November 4, 1948, Serial No. 58,235

1 Claim. (Cl. 107—6)

This invention relates to a machine for making pastries, and more especially to improvements in machines for cutting baigles from the raw dough preparatory to baking the same.

Heretofore baigles, which are doughnut-shaped pastries which are prepared of sweetened, leavened bread dough, allowed to raise, boiled to partially cook them, and finally baked as distinguished from conventional doughnuts which are fried in deep fat, have been made almost exclusively by hand. As hand made, the dough which is quite stiff is rolled out in sheet form and then punched with concentrically arranged cutters to sever an annulus of dough therefrom with an accompanying center piece. Even with very careful cutting with the circular cutters there are waste pieces of dough of generally triangular shape left over as well as the center pieces which amount to as much as fifty percent of the original sheet of dough, and to save them it is conventional to re-work, re-roll and cut the resultant sheet again. This re-working, however, represents loss of time and low production with increased cost to the baker.

Objects of this invention are to provide a machine for cutting large numbers of pastries from a sheet of dough rapidly, which will eliminate waste of dough except for the center pieces when cutting annular pieces so that the amount of re-working is minimized, which will minimize handling and hence be more sanitary, and which will be easy to operate, easy to clean, and durable in its construction.

In accordance with the foregoing objects, the machine has a gang of cutters and a tray for receiving a sheet of dough, the cutters and tray being relatively movable to bring the cutters and dough into engagement to cut therefrom a plurality of pastries. To minimize waste, the cutters are substantially hexagonal in shape and are arranged with their edges contiguous, that is, with the entire cutting edge of each cutter within the gang common to the surrounding adjacent cutters, and the tray has an inside contour corresponding to the periphery of the gang of cutters and adapted telescopically to receive the same. Since the cutters are arranged in the form of a honey-comb and the tray corresponds in shape to the outer periphery of the gang cutters, there will be substantially no waste between the cutters of the dough and only a very narrow strip at the marginal edge thereof.

Each cutter has inner and outer concentrically arranged cutting edges so that when it penetrates the dough an annulus of dough and a center piece will be cut therefrom. To expel the dough from the cutters, ejectors are arranged in the annular space between the cutters and within the inner cutter. The ejectors for both the inner and outer cutters are raised as the dough is brought into engagement with the cutters to permit penetration of the cutting edges. Following cutting, the ejectors in the annular spaces are caused to expel the annular pieces of dough, whereas the inner ejectors are held in an inoperative position so that the center pieces are retained in the inner cutters until the tray has returned to its initial position and is cleared of the annular pieces of dough. As illustrated, the ejectors are raised out of operative position by movement of the tray into engagement with the cutters and the outer ejectors are allowed to descend by lowering of the tray. A latch retains the inner ejectors retracted and is releasable to permit ejection of the center pieces from the center cutters when desired.

The invention will be described more specifically with reference to the accompanying drawings in which:

Fig. 3 is a somewhat enlarged section of the cutting head taken transversely of the machine on the line 3—3 of Fig. 1;

Fig. 4 is a detailed section of latch means;

Fig. 5 is a top view to somewhat smaller scale looking down on Fig. 4;

Fig. 6 is an isometric view of a pastry as formed by the cutters prior to baking;

Fig. 7 is an isometric view of one form of tray for the raw dough;

Fig. 8 is a vertical section through an alternative form of tray;

Fig. 9 is an elevation on the line 9—9 of Fig. 2 showing retractable gauge fingers for positioning the tray with respect to the cutters.

Figure 1:
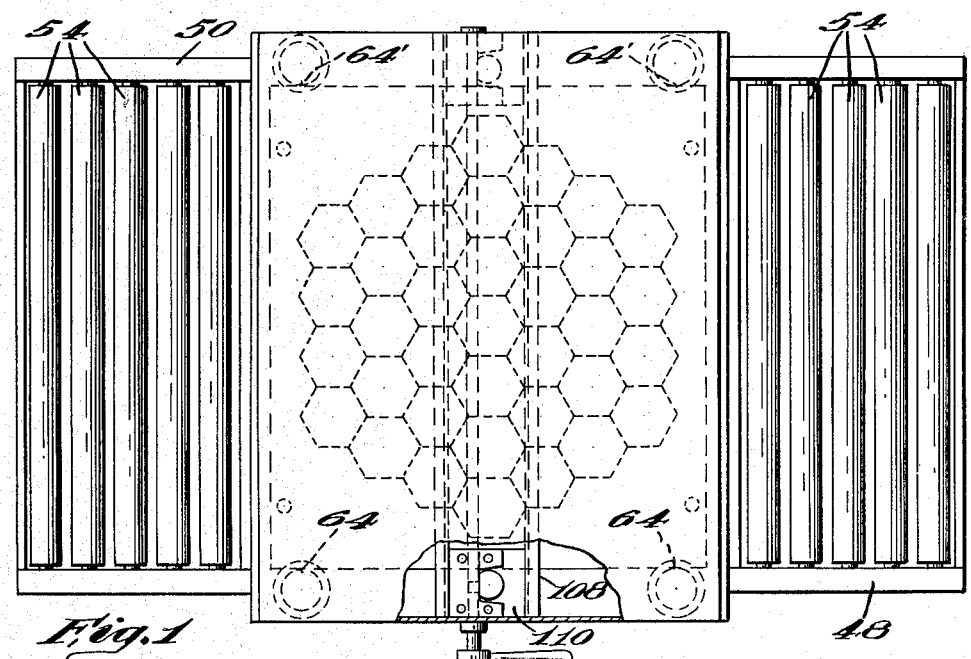
Fig. 1 is a plan view of the machine forming the subject matter of the present invention.
Figure 2:
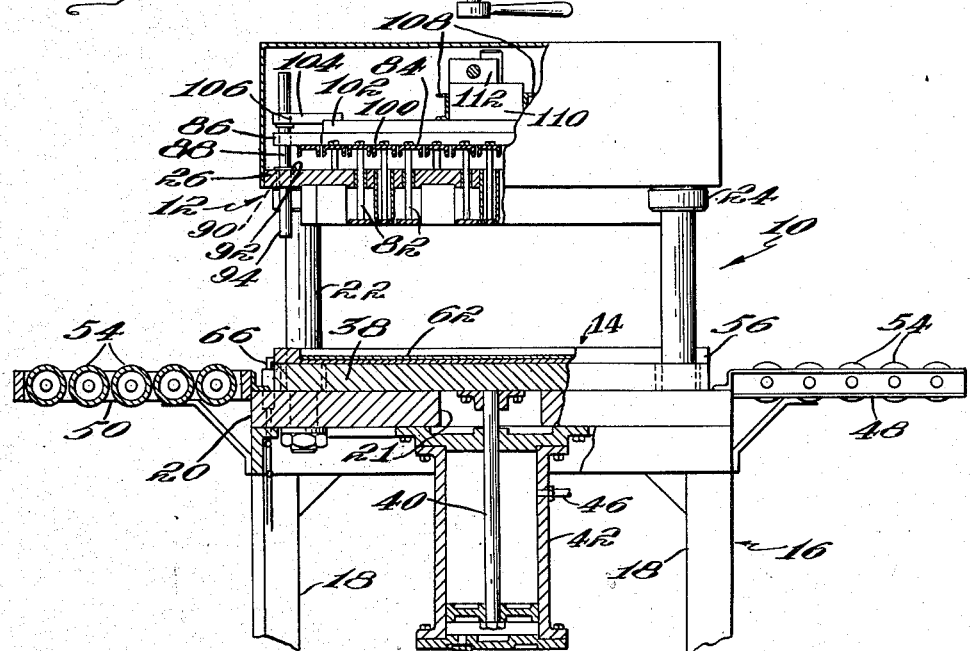
Fig. 2 is a side elevation, partly in section, substantially on the line 2—2 of Fig. 1.

Referring to Fig. 2, the machine 10 is illustrated as comprised essentially of a cutter head 12, a support 14 for receiving the raw dough for movement into engagement with the cutters carried by the cutter head, and a bench or table 16 for supporting the aforesaid parts in operating relation to each other. The bench 16 has four legs 18 to the upper ends of which is rigidly attached, as by welding or other suitable means, a rigid rectangular bed plate 20 having a flat upper surface and a central opening 21 therethrough from top to bottom. As illustrated, four posts 22 are fastened to the bed plate 20 at the corners thereof in vertical positions, and near their upper ends have secured thereto collars 24 on which rest a horizontal, substantially rectangular, rigid head plate 26, the surface of which is parallel to that of the bed plate. The head plate 26 constitutes a support for the cutters and is fixed in position, that is, does not have vertical movement itself with respect to the bed plate 20. In the lower surface of the head plate 26 there are formed furrows 27 in which are inserted cutters 28. Each cutter in its entirety is hexagonal in shape and these hexagonal cutters are arranged in honey-comb fashion, that is, so that all six of the sides of each cutter within the body or gang of cutters except for the bordering cutter is common to at least one side of an adjacent cutter, as is clearly illustrated in Fig. 1. The bordering cutters have two sides which are exposed and which are not common to any other cutter, and these edges collectively define the periphery of the gang of cutters. With this construction it is clear that the cutting edges 30 of these cutters, when caused to penetrate a sheet of dough, will make a single cut through the dough in dividing one pastry from the next so that there is no waste as would normally be caused where the cutting edges of adjacent cutters were not common but had intervening spaces such as would be the case if the cutters were circular and arranged in tangential engagement. Within each of the hexagonal cutters 28 there is concentrically arranged a circular cutter 32 of smaller diameter in the form of a tube, the upper end of which is set into an aperture 34 formed in the head plate 26, and the lower end of which terminates in a cutting edge 36 situated in the plane of the cutting edges of the hexagonal cutters 28. As thus arranged, when the dough and cutters are brought into engagement, there will be cut from the dough an annular piece P (Fig. 6) having a peripheral surface which is hexagonal and a circular opening at its center.

To bring the dough and cutters together to effect cutting, there is situated on the bed plate 20 an elevator plate 38, this plate being substantially rectangular and being of such dimensions transversely of the machine as to fit snugly between the vertical posts 22 but with sufficient clearance to allow free vertical movement thereof. To the underside of the elevator plate 38 there is fastened a piston rod 40 which forms part of a piston and cylinder assembly 42 bolted to the underside of the bed plate over the opening 21. The cylinder is adapted to be supplied with a motivating fluid through pipes 44 and 46 to raise and lower the piston within the cylinder and hence to raise and lower the elevator plate 38. At opposite ends of the bed plate there are mounted horizontal, laterally projecting brackets 48 and 50 which rotatably support a plurality of spaced, parallel rollers 54 which constitute conveyor means, the right-hand one of these being adapted to receive a tray of dough and to assist in introducing the tray into the machine on top of the elevator plate, and the other being adapted to receive the tray from the elevator after the dough has been cut for withdrawing it from the machine. The plane of the top of these rolls 54 is substantially concomitant with the plane of the elevator plate 38 so that a pan or tray placed on these rolls will slide freely onto or off of the top surface of the elevator plate 38 without lifting it. The pan or tray 56 which receives the dough, as shown in Fig. 7, is substantially rectangular, and has in its upper surface 57 a shallow recess 58, the peripheral wall 60 of which is substantially vertical and has a contour corresponding in shape to the contour or outline of the gang of cutters but being of slightly larger overall area so as telescopically to receive the cutters within it. There is approximately a ⅛" clearance between the walls of the tray and the periphery of the gang of cutters. The pan may be produced by recessing the upper surface of a solid plate of metal of suitable thickness, for example, by a hobbing process, or by cutting a plate through from top to bottom and fastening it to a flat bottom member. Alternatively the tray may be made by taking a rectangular sheet metal pan 56' (Fig. 8), placing therein a strip of metal 60' bent to have the configuration of the perimeter of the gang of cutters, and fastening the same in place by suitable braces 59. A sheet of fibrous or other non-metallic material 62, which is water-proof and not easily damaged by the cutting edges of the cutter, is placed in the bottom of the pan to cushion the cutters as they penetrate the dough and hence to preserve the lift of the cutting edges. The tray is of sufficient overall width so that its side edges will just fit between the opposite pairs of posts 22 having substaintial tangential engagement therewith at the points 64—64 and 64'—64', as indicated in Fig. 1. By proper preliminary design the bearing points between the sides of the tray and the posts 22 may be arranged to insure accurate vertical alignment of the dough-receiving cavity 58 in the tray with the gang of cutters in the head so that, as respects to transverse position, the gang of cutters and tray will be in their proper positon. To insure accurate vertical alignment of the tray with the cutters lengthwise of the machine, there are placed at the left end of the bed plate 38 (Figs. 2 and 9) a pair of retractable gauge fingers 66. Each finger is set into a hole 67 drilled through the bed plate on top of a spring 69. When the fingers project above the top surface of the bed plate they will be engaged by the forward edge of the tray 56 and hold it in its proper position lengthwise of the machine so that when the tray is brought into engagement with the cutters the latter will enter the cavity 58. To retract the finger 66 when it is desirable to discharge the tray by pushing it onto the conveyor 54, the fingers are connected by way of stems 74 attached at their lower ends to a cross rod 75. The cross rod is in turn connected to a treadle rod 76 extending down to the floor, the lower end of which is attached to a treadle 78 which by depression may be caused to retract the fingers to an out-of-the-way position. A spring 72 may be placed below the treadle to assist in restoring the fingers to their normal position when the treadle is released.

After a tray of dough has been placed upon the elevator plate 38 and the latter has been raised into engagement with the fixed cutters supported in the cutter head, as heretofore described, it is desirable to expel both the annular piece of dough which will constitute the baigle when finally baked and the center piece which is removed therefrom. To this end there are provided ejectors in the form of plungers associated with the cutters 28 and 32. As illustrated in Fig. 3, the plunger or ejector for expelling the annulus of dough is in the form of an annular ring 80 (Figs. 2 and 3) situated in the annular space between the hexagonal cutter and the circular cutter, the ejector being movable vertically within this space. To effect vertical movement of the ejector there are attached to the upper side thereof a pair of rods 82 (Fig. 2) which extend vertically upward through the head plate 26 and are attached to horizontally arranged parallel channel bars 84, the latter being connected at their opposite ends to a pair of parallel spaced channel bars 86 (Fig. 3) which form the side members of a rigid frame situated at the upper side of the head plate 26. The frame, which is constituted by the channel members 84 and side members 86, is fixed to and supported by four spindles 88 situated at its four corners, the spindles in turn being supported for vertical movement in four apertures 90 formed in the corners of the head plate 26. To limit downward movement of the spindles 88 there are fixed thereto collars 92 for engagement with the upper surface of the head plate 26. The spindles extend below the head plate 26, and their lower ends 94 provide, as will appear hereinafter, means for raising the frame 86 and hence the ejectors 80 to move them upwardly with respect to the cutting edges 30 and 36. Within each of the circular cutters 32 there is a disk-shaped ejector 96 which is movable vertically within the cutter. Vertical movement of these ejectors 96 is effected by rods 98 attached to the upper side of the ejector and connected to horizontally arranged parallel channels 100 situated above the plate 26 and alternating with the channel members 84. The channel members 100 are attached at their opposite ends to a pair of spaced, parallel, horizontally arranged channel members 102 to form a rigid frame. Fixed to the frame 102 at the corners thereof (Fig. 2) are laterally extending bracket pieces 104 having vertical apertures in their free ends for receiving through them the upper ends of the spindles 88. The frame 102 rests on the frame 86, and hence vertical movement of the frame 86 will effect vertical movement of the frame 102 and thus raise the center ejector disks relative to the cutting edges of the cutters.

It is desirable to expel the annular pieces of dough first and to allow them to return with the tray to its initial position upon the bed plate, whereupon the tray may be removed from the machine, the dough is allowed to raise, and then the severed sheet is dumped into a kettle of boiling water without having to separate the individual pieces or to pick out the center pieces. Separation of the pieces will take place itself during boiling which is continued for a sufficient length of time to partially cook the pieces and round them out, whereupon they are placed in an oven and then cooking completed by baking. To this end the ejectors, after they have been raised to permit the cutters to penetrate the dough, are arranged to be released successively first to expel the annular pieces of dough and then to expel the center pieces. To this end latch means is provided for holding the center ejectors 96 in their raised position until the tray has descended with the elevator plate to its initial position and the baker has had time to remove the tray from the machine. As illustrated in Figs. 1, 2 and 3, there is fixed to the top of the frame 102 substantially centrally thereof a pair of spaced channel bars 108 between the opposite ends of which at opposite sides of the machine are fixed blocks 110 (Figs. 4 and 5). To the top side of each block there is fastened a second block 112, and through the blocks 112 there are formed horizontal apertures 114 for rotatably receiving the opposite ends of a shaft 116. The blocks 110 have vertical openings 118 therein, and through these vertical openings pass vertical posts 120, the lower ends of which are fixed, as shown in Fig. 3, to the upper side of the head plate 26. The posts 120 have flat sides 121 which occupy and intersect cavities 122 formed in the blocks 110. Within each cavity 122 there is placed a ball 124 so that it is situated between the flat surface 121 and an inclined surface 126 forming one wall of the cavity. As thus arranged, relative movement of the block 110 and post 120 in one direction will be limited by binding of the ball 124 between the surfaces 121 and 126 unless the ball is moved to a position in which it is not engaged by these surfaces. As a result, when the frame 102 is raised to raise the ejectors 96 to an inoperative position, it will stay in this raised position by reason of the engagement of the ball 124 with the surfaces 121 and 126. To release the frame and to allow it to descend there is provided a plunger 134 which enters the cavity 122 above the ball so that its lower end rests on the ball. Its upper end enters the opening 114 and engages a cam surface 126' on the shaft 116. By rotation of the shaft, the plunger may be caused to push the ball downwardly and thus to disengage it from the surfaces 121 and 126 to permit the frame to descend freely. To effect camming action, a lever 138 is fastened to one end of the rod 116. The ball 124 is urged toward its locking position by a spring-supported plunger 128 set in an aperture 130 in the lower wall of the cavity 122.

In the operation of the machine a sheet of dough is placed in the tray 56, the tray is placed on the conveyor 54 and is pushed inwardly onto the elevator plate between the guide posts 22 until its forward edge engages the gauge pins 66. Fluid is then admitted to the lower end of the cylinder 42 to raise the piston and hence raise the elevator toward the cutters. As the elevator rises, and just before the surface of the dough comes into engagement with the cutting edges of the cutter, the upper marginal surface of the tray engages the lower ends 94 of the spindles 88. As the tray is raised further to cause penetration of the dough, the spindles 88 are raised to retract two ejectors 80 and 96. As soon as the cutting has been effected, the tray is lowered by cutting off the driving fluid at the lower end of the piston and by introducing fluid to the upper end of the piston, whereupon the elevator descends thereby separating the tray from the cutters. The initial downward movement of the tray allows the spindles 88 to descend, with the result that the ejectors 80 will expel the annular pieces of dough from the cutting edges of the cutters at substantially the moment the tray leaves the cutting edges so that each of these pieces will remain on the tray undisturbed. Initial downward movement of spindles 88 will also bring about engagement of the latch constituted by the balls 124, rods 120, and cavities 122 to lock the upper frame 102 in its raised position, this being permitted by reason of the fact that the brackets 104 may slide relatively to the spindles 88. When the elevator has returned to its normal position on the bed plate and the tray has been removed from the machine, an empty tray or pan may be placed below the cutters, whereupon the lever 138 may be actuated to release the latch means and hence permit the frame 102 to return to its lowermost position against the top of the frame 84 and at the same time to cause the center ejectors 96 to expel the center pieces of dough from the center cutters. The expelled center pieces will fall onto the empty tray on the elevator and may be removed for re-working.

It should be understood that the present disclosure is for the purpose of illustration only, and that this invention includes all modifications and equivalents which fall within the scope of the appended claim.

I claim:

A machine for making pastries comprising a vertically movable elevator plate for receiving a tray of sheet dough, a fixed crosshead situated above the elevator plate, cutters fixed to the underside of the crosshead, means for effecting vertical movement of the elevator plate to bring the dough into engagement with the cutters, said cutters each comprising an outer closed cutter within which there is an inner closed cutter, a plunger situated between the outer and inner cutters and another plunger situated within the inner cutter, a pair of movable frames above the crosshead, the outer plungers being attached to one of the frames and the inner plungers being attached to the other of the frames, rods fixed to one of the frames engageable by upward movement of the elevator plate to lift both frames and hence to raise the plungers away from the cutting edge of the cutters, latch means for latching the frame to which the inner plungers are attached in a raised position, said other frame being free to return to its initial position upon recession of the elevator plate to cause said outside plunger to expel the dough between the cutters onto the tray, and means for thereafter releasing said latch to cause the inside plunger to expel the dough within the inside cutter.

JACK M. ZEPRUN.

REFERENCES CITED

The following references are of record in the file of this patent:

UNITED STATES PATENTS

| Number | Name | Date |
| --- | --- | --- |
| 167,476 | Shaw | Sept. 7, 1875 |
| 1,013,634 | Armstrong | Jan. 2, 1912 |
| 1,353,077 | Smith | Sept. 14, 1920 |
| 1,548,127 | Filbry | Aug. 4, 1925 |
| 1,847,150 | Ward | Mar. 1, 1932 |
| 2,137,811 | Royal | Nov. 22, 1938 |